Dec. 24, 1957  E. T. CONAWAY  2,817,111
APPARATUS FOR SUPPORTING BIRDS FOR INSPECTION AND/OR PROCESSING
Filed Sept. 8, 1955

INVENTOR
Everett T. Conaway
BY
ATTORNEYS

United States Patent Office 2,817,111
Patented Dec. 24, 1957

2,817,111

APPARATUS FOR SUPPORTING BIRDS FOR INSPECTION AND/OR PROCESSING

Everett T. Conaway, Salisbury, Md.

Application September 8, 1955, Serial No. 533,085

5 Claims. (Cl. 17—44.1)

This invention relates to apparatus for supporting birds for inspection and processing for marketing. Such processing may include the steps of dressing, with inspection of the birds during dressing.

An important object of the invention is to provide an apparatus for supporting birds in most convenient positions for rapid and sanitary processing, as employed in modern processing plants, with inspection of the exposed viscera while it is still attached to the birds.

Another important object is to provide an apparatus for supporting birds, in positions inclined from the vertical, for processing, with their wings supported outspread and supported in a manner to prevent damage thereto, their bodies substantially free of the support means, and their legs rigidly supported at the hock joints in such manner that the birds will not become displaced during processing and inspection.

Still another important object is to provide an apparatus to function as described above, the major and essential portion of which may be constructed of a single length of preferably heavy wire carried by two support members which may be carried, in turn, by an endless conveyor, as by depending therefrom, and thus provide an inexpensive and readily fashioned apparatus which, because of its shape and small number of parts, is readily cleaned and sterilized.

Additionally, an important object is to provide an apparatus for positioning a bird in a substantially horizontal position for processing, which renders processing from either end of the bird convenient, particularly when a support is positioned below the bird support for receiving, in separate compartments, the offal and giblets, as more particularly described in my application, Serial No. 533,086, for patent entitled "Apparatus for Supporting Birds and Their Viscera for Inspection and/or Processing" filed concurrently herewith.

Other objects and advantages of the invention will be apparent during the course of the following detailed description of the invention, taken in connection with the accompanying drawing, forming a portion of this disclosure and in which drawing.

Figure 1:
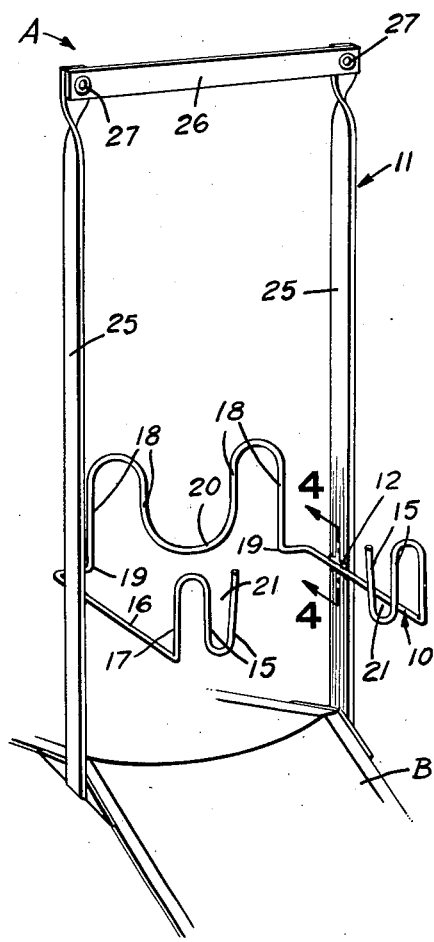
Fig. 1 is a perspective view of the apparatus with a fragment of a support carried thereby.

In the drawing, wherein for the purpose of illustration is shown a preferred embodiment of the invention and wherein similar reference characters are employed to designate like parts in the several views, the letter A designates the apparatus of this invention, with a support B thereunder and C designates a bird carried by the apparatus A.

The apparatus A comprises bird-supporting means 10, carrying means 11 for supporting the bird-supporting means, and means 12 for attaching the means 10 to the means 11.

Figure 2:
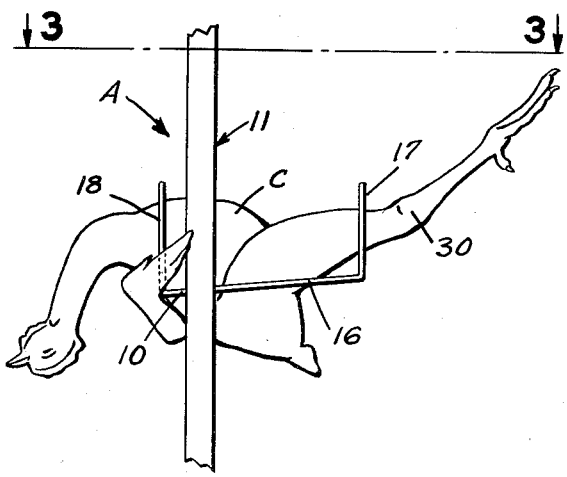
Fig. 2 is a fragmentary side elevation of the apparatus, with a bird disposed upon the bird-supporting means thereof.
Figure 3:
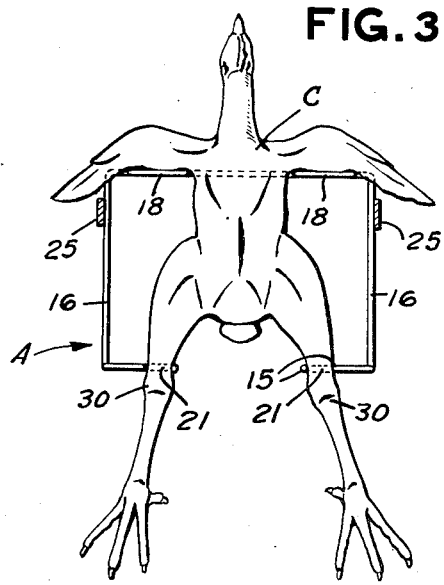
Fig. 3 is a horizontal section, substantially on the line 3—3 of Fig. 2.

Preferably, the bird-supporting means 10 comprises a frame formed of a single length of stout or heavy wire such as, for example, gauge 9 of the U. S. standard gauge, preferably plated or otherwise treated against corrosion, and fashioned, as by bending, into leg-supporting means comprising two upwardly-extending leg-supporting portions 15, preferably formed of the terminal portions of the wire length, two elongated and inclined carrying means attached portions 16, which are preferably formed from intermediate portions of the wire length and joined to the portions 15 by other intermediate portions 17 of the wire length, wing-supporting means comprising two upwardly-extending wing-abutting portions 18 formed from portions of the wire length adjacent its central portion and joined to the portions 16 by other intermediate portions 19 of the wire length, and back-supporting means comprising a downwardly-bowed back-supporting portion or cradle 20 which preferably constitutes the central portion of the wire length and is in substantialy the same vertical plane as the two wing-abutting portions. Thus there are provided two upwardly-opening leg receiving notches 21, two wing-abutting shoulders, formed by the portions 18 with the wing-abutting surfaces thereof substantially normal to the horizontal axes of the notches 21 and the back-supporting portion 20. It will be noted, as in Fig. 2, that the portions 16 are inclined downwardly from the portions 17 with the bottoms of the leg-receiving notches 21 higher than the lowest parts of the back-supporting portion 20 and wing-abutting portions 18, so that a bird, such as that shown at C, will be disposed in the best position for inspection and/or processing. This arrangement permits equally convenient access to the neck or tail ends of the bird, which would not be the case if the bird were materially inclined.

The width of each notch 21 is such that the hock 30 of the bird leg may be positioned outwardly of the notch and will be held in abutment with the outer faces of the portions 15.

It will be noted that the body of the bird is supported by the relatively narrow support portion 20, whereby there is apt to be substantially no damage to the skin of the body as is often the case where the back is supported over a considerable area either by a solid support or a support, for example, of a plurality of wires.

The carrying means 11 for supporting the means 10 preferably comprises two spaced-apart upwardly-extending members 25 which may be preferably rigid metallic straps or arms joined at their upper end portions by a cross member 26 preferably of material like that of the members 25. Openings 27 are provided in the means 11 for receiving fastener means (not shown) for securing the apparatus A to a conveyor (not shown). Such openings may be provided by grommets.

Figure 4:
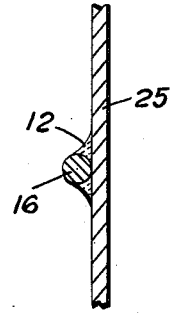
Fig. 4 is a vertical section, substantially on the line 4—4 of Fig. 1.

Means 12 to attach the means 10 to the means 11 may be solder, for example, between facing areas of the members 25 and the respective portions 16 as in Fig. 4.

It is important for proper balancing of the means 10, particularly when the apparatus is loaded, that the means 12 attach the means 10 to the means 11 quite closely adjacent the portions 18 and spaced well away from the portions 15.

Shown, by way of example, is a killed and defeathered bird C.

Carried below the means 10 may be suitable support, designated generally as B, which may provide means to retain portions removed from a bird during processing. A support of this nature is fully disclosed in my application for patent referred to above and filed concurrently herewith.

The operator will be able to quickly detachably secure the bird to the means 10 by grasping the bird by the lower portions of the legs and move it through the space between the members 25 to that the wings will be beyond the portions 18 and until the back comes to rest upon the portion 20 with the wings abutting the portions 18. By drawing forwardly and downwardly on the legs, the legs will enter the notches 21 and the hocks 30 abut the outer faces of the portions 15. The bird is now supported in the most satisfactory manner for processing and the like.

Various changes may be made to the form of invention herein shown and described without departing from the spirit of the invention or scope of the claims.

What is claimed is:

1. Apparatus for supporting birds for inspection and/or processing for subsequent marketing as dressed, including support means to support a bird body in a substantially horizontal position with the bird head and neck hanging downwardly, and support means including leg-supporting portions provided with leg-receiving upwardly-opening notches, each notch having a bottom, a back-supporting cradle having a back-receiving face, with the bottoms of said notches above the horizontal plane of said back-receiving face, carrying means for and secured to said support means, and means connecting said leg-supporting portions and cradle, including inclined portions, inclined downwardly from said leg-supporting portions.

2. Apparatus according to claim 1 characterized in that said leg-supporting portions extend substantially vertically and said inclined portions form obtuse angles with said leg-supporting portions.

3. Apparatus for supporting birds for inspection and/or processing for subsequent marketing as dressed, including support means to support a bird in a position inclined from the vertical, comprising a single length of stout wire formed into two upwardly-extending leg-supporting portions each provided with an upwardly-opening leg-receiving notch, two elongated portions, portions connecting each leg-supporting portion with a like end of an elongated portion, two upwardly-extending wing-abutting portions, portions connecting each wing-abutting portion with the opposite like end of an elongated portion, a back-supporting portion, and portions connecting the ends of said back-supporting portion with said wing-abutting portions, with said back-supporting portion and wing-abutting portions in substantially the same vertical plane, and carrying means for and secured to the support means, including two upwardly-extending elongated members with said elongated portions secured thereto.

4. Apparatus according to claim 3 characterized in that said elongated portions are inclined with respect to said elongated members so that the bottom parts of said leg-supporting portions are above the horizontal plane of said back-supporting portion.

5. Apparatus according to claim 3 characterized in that said elongated portions are secured to said elongated members adjacent said wing-abutting portions and spaced remote from said leg-supporting portions.

References Cited in the file of this patent

UNITED STATES PATENTS

| | | |
|---|---|---|
| 1,323,071 | Krieger | Nov. 25, 1919 |
| 2,051,989 | Ellis | Aug. 25, 1936 |
| 2,189,484 | Brodeur | Feb. 6, 1940 |
| 2,405,638 | Bilek | Aug. 13, 1946 |